United States Patent
Rao et al.

(10) Patent No.: US 11,906,982 B2
(45) Date of Patent: Feb. 20, 2024

(54) SYSTEM AND METHOD FOR DRONE DOCKING

(71) Applicant: Far EasTone Telecommunications Co., Ltd., Taipei (TW)

(72) Inventors: Herman Chunghwa Rao, Taipei (TW); Chen-Tsan Yu, Taipei (TW); Hua-Pei Chiang, Taipei (TW); Chien-Peng Ho, Taipei (TW); Chyi-Dar Jang, Taipei (TW); Sheng Yang, Taipei (TW); Tsung-Jen Wang, Taipei (TW)

(73) Assignee: Far EasTone Telecommunications Co., Ltd., Taipei (TW)

( * ) Notice: Subject to any disclaimer, the term of this patent is extended or adjusted under 35 U.S.C. 154(b) by 282 days.

(21) Appl. No.: 17/008,655

(22) Filed: Sep. 1, 2020

(65) Prior Publication Data
US 2021/0365047 A1 Nov. 25, 2021

(30) Foreign Application Priority Data

May 25, 2020 (TW) ................................. 109117285

(51) Int. Cl.
| | |
|---|---|
| G05D 1/06 | (2006.01) |
| B64U 70/00 | (2023.01) |
| B64U 80/86 | (2023.01) |
| B64C 39/02 | (2023.01) |
| G05D 1/00 | (2006.01) |

(52) U.S. Cl.
CPC ......... *G05D 1/0684* (2013.01); *B64C 39/024* (2013.01); *B64U 70/00* (2023.01); *B64U 80/86* (2023.01)

(58) Field of Classification Search
CPC .............. B64C 39/024; B64C 2201/18; B64C 2201/208; B64C 2201/14; G05D 1/0684
See application file for complete search history.

(56) References Cited

U.S. PATENT DOCUMENTS

| | | | |
|---|---|---|---|
| 9,704,409 B2* | 7/2017 | Prakash | ................ B64D 35/02 |
| 10,059,467 B2 | 8/2018 | Wang | |

(Continued)

FOREIGN PATENT DOCUMENTS

| | | |
|---|---|---|
| CN | 209258414 | 8/2019 |
| TW | I626191 | 6/2018 |

(Continued)

OTHER PUBLICATIONS

"Office Action of Taiwan Counterpart Application", dated Mar. 3, 2021, p. 1-p. 11.

*Primary Examiner* — Geepy Pe
*Assistant Examiner* — Paulo Roberto Gonzalez Leite
(74) *Attorney, Agent, or Firm* — JCIPRNET

(57) ABSTRACT

A system and a method for drone docking are provided. The method includes: setting a moving platform on a vehicle; obtaining, by the moving platform, current environmental data and historical environmental data corresponding to the moving platform; generating, by the moving platform, a recommended flight parameter according to the current environmental data and the historical environmental data, and transmitting the recommended flight parameter to a drone; and adjusting, by the drone, a flight parameter of the drone according to the recommended flight parameter to dock on the moving platform.

10 Claims, 4 Drawing Sheets

(56) References Cited

U.S. PATENT DOCUMENTS

| | | | |
|---|---|---|---|
| 10,395,544 B1 | 8/2019 | Harris et al. | |
| 2011/0202209 A1* | 8/2011 | Moresve | G05D 1/0684 |
| | | | 701/15 |
| 2016/0207637 A1 | 7/2016 | Campillo et al. | |
| 2017/0113799 A1 | 4/2017 | Kovac et al. | |
| 2018/0357909 A1* | 12/2018 | Eyhorn | G08G 5/0039 |
| 2022/0024580 A1* | 1/2022 | Wake | G08G 5/0052 |

FOREIGN PATENT DOCUMENTS

| | | |
|---|---|---|
| TW | I645370 | 12/2018 |
| TW | M604938 | 12/2020 |
| WO | 2017198696 | 11/2017 |
| WO | 2018236903 | 12/2018 |
| WO | 2019018602 | 1/2019 |
| WO | 2019023297 | 1/2019 |
| WO | 2019226917 | 11/2019 |

\* cited by examiner

SYSTEM AND METHOD FOR DRONE DOCKING

CROSS-REFERENCE TO RELATED APPLICATION

This application claims the priority benefit of Taiwan application serial no. 109117285, filed on May 25, 2020. The entirety of the above-mentioned patent application is hereby incorporated by reference herein and made a part of this specification.

BACKGROUND

Field of the Disclosure

The disclosure relates to a method for a drone to decide to dock based on environmental data and historical environmental data, and in particular to a system and a method for docking a drone on a moving platform.

Description of Related Art

With the development of communication technology, more and more industries have begun to use wireless communication technology to control drones to perform simple tasks, such as transporting goods or monitoring environmental conditions. Since drones require fixed take-off and landing platform, the current application of drones can only be implemented in a small area. In order to increase the working area for the drone, the technology of setting the take-off and landing platform of the drone on a vehicle has now been developed. Setting the take-off and landing platform of the drone on the vehicle not only can expand the working area of the drone, but also enable the vehicle to obtain real-time environmental information through the drone, thereby assisting the vehicle to plan the route.

However, the current drone technology can only allow the drone to dock based on the information of the drone itself. When the vehicle starts to move, the drone will have difficulty in determining the best timing for docking. In addition, when the vehicle is located at an unfavorable environment (for example: the environment with poor road condition or windy condition, etc.), the drone will not be able to dock accurately. In view of the foregoing, how to provide a technology that enables a drone to be stably docked on a vehicle is one of the goals to be attained by practitioners of the art.

SUMMARY OF THE DISCLOSURE

The disclosure provides a system and a method for drone docking, which enables the drone to be stably docked on a moving platform provided on a vehicle.

The system for drone docking disclosed in the disclosure is adapted for a vehicle. The system includes a drone and a moving platform. The moving platform is disposed on a vehicle and in communication with the drone, wherein the moving platform obtains the current environmental data and historical environmental data corresponding to the moving platform. The moving platform generates recommended flight parameters based on the current environmental data and historical environmental data, and transmits the recommended flight parameters to the drone. The drone adjusts the flight parameters of the drone according to the recommended flight parameters and docks on the moving platform according to the flight parameters.

In an embodiment of the disclosure, the current environmental data is associated with at least one of location information, moving speed, moving direction, communication status, wind speed, time, and weather, and historical environmental data is associated with road conditions.

In an embodiment of the disclosure, the recommended flight parameters and flight parameters are associated with at least one of the following: attitude, heading, and flight speed.

In an embodiment of the disclosure, the drone adjusts flight parameters according to the sensing data corresponding to the drone and the recommended flight parameters, wherein the sensing data includes at least one of the following: flight speed, heading, attitude, power, stability, wind speed, and the relative distance between the drone and the moving platform.

In an embodiment of the disclosure, the moving platform determines that the moving platform is about to pass through a curve based on the current environmental data and the historical environmental data, and transmits recommended flight parameters to the drone in response to that the moving platform is about to pass through the curve, wherein the recommended flight parameters instruct the drone not to dock within a period of time.

In an embodiment of the disclosure, the moving platform transmits the recommended flight parameters to the drone in response to that the moving speed of the moving platform is higher than a speed threshold, wherein the recommended flight parameters instruct the drone not to dock within a period of time.

In an embodiment of the disclosure, the communication status includes communication quality, wherein the moving platform transmits the recommended flight parameters to the drone in response to that the communication quality is lower than a communication quality threshold, wherein the recommended flight parameters instruct the drone not to dock within a period of time.

In an embodiment of the disclosure, the moving platform transmits the recommended flight parameters to the drone in response to that the wind speed is higher than a wind speed threshold, wherein the recommended flight parameters instruct the drone not to dock within a period of time.

In an embodiment of the disclosure, the moving platform transmits the recommended flight parameters to the drone in response to poor road conditions, wherein the recommended flight parameters instruct the drone not to dock within a period of time.

In an embodiment of the disclosure, the moving platform is coupled to the output device in the vehicle, the drone transmits a warning message to the moving platform in response to that the power is lower than a power threshold, and the moving platform prompts the driver to change the route of the vehicle by the output device according to the warning message.

In an embodiment of the disclosure, the moving platform includes a plurality of docking areas, wherein the recommended flight parameters instruct the drone to dock in one of the plurality of docking areas.

In an embodiment of the disclosure, the moving platform uploads the current environmental data and the docking result of the drone to the cloud server to update the historical environmental data stored in the cloud server.

A method for drone docking disclosed in the disclosure is adapted for a drone and a moving platform. The method includes: setting a moving platform on a vehicle; obtaining, by the moving platform, current environmental data and historical environmental data corresponding to the moving platform; generating, by the moving platform, recommended flight parameters according to the current environmental data and the historical environmental data, and transmitting the recommended flight parameters to the drone; and adjusting, by the drone, the flight parameters of the drone according to the recommended flight parameters to dock on the moving platform.

Based on the above, the moving platform in the disclosure can obtain surrounding environmental data through sensors, so as to correct the flight trajectory of the drone through the environmental data, thereby making the docking of the drone more accurate and stable.

DESCRIPTION OF EMBODIMENTS

Figure 1:
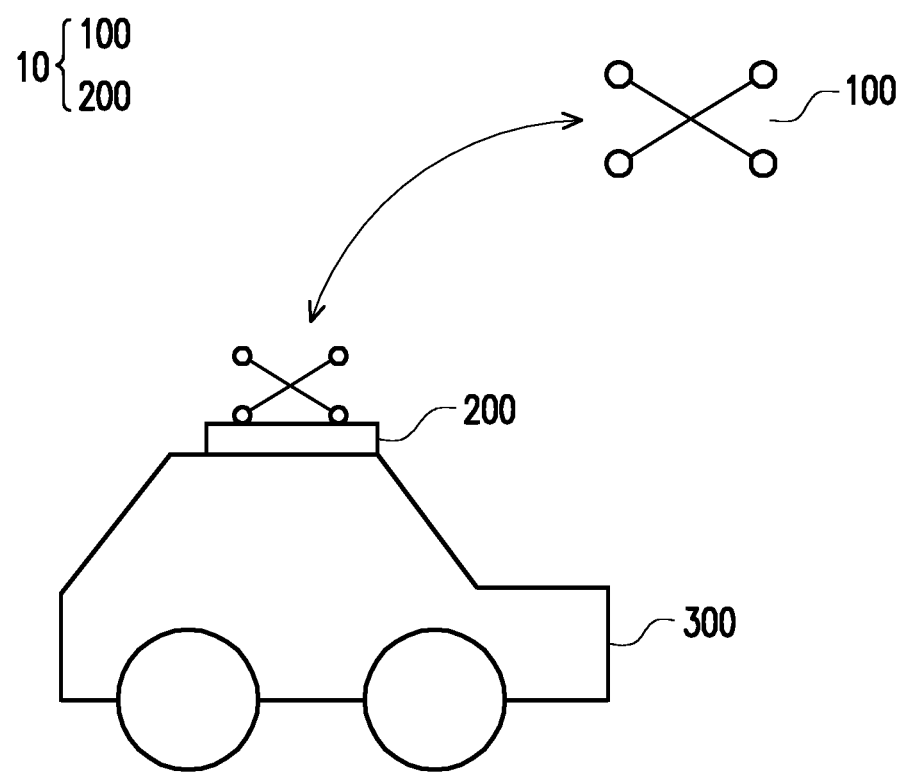
FIG. 1 is a schematic view of a system for drone docking and a vehicle according to an embodiment of the disclosure.

In order to make the content of the disclosure more comprehensible, the following embodiments are given as examples based on which the disclosure can indeed be implemented. In addition, wherever possible, elements/components/steps with the same reference numerals in the drawings and embodiments represent the same or similar components.

FIG. 1 is a schematic view of a system 10 for drone docking and a vehicle 300 according to an embodiment of the disclosure. The system 10 may include a drone 100 and a moving platform 200. The moving platform 200 may be disposed on the vehicle 300. The moving platform 200 can be in communication with the drone 100 and transmit a signal for assisting the drone 100 to the drone 100. In this way, no matter whether the vehicle 300 is in a stationary state or a moving state, the drone 100 can be accurately and stably docked on the moving platform 200 with the assistance of the moving platform 200.

Figure 2:
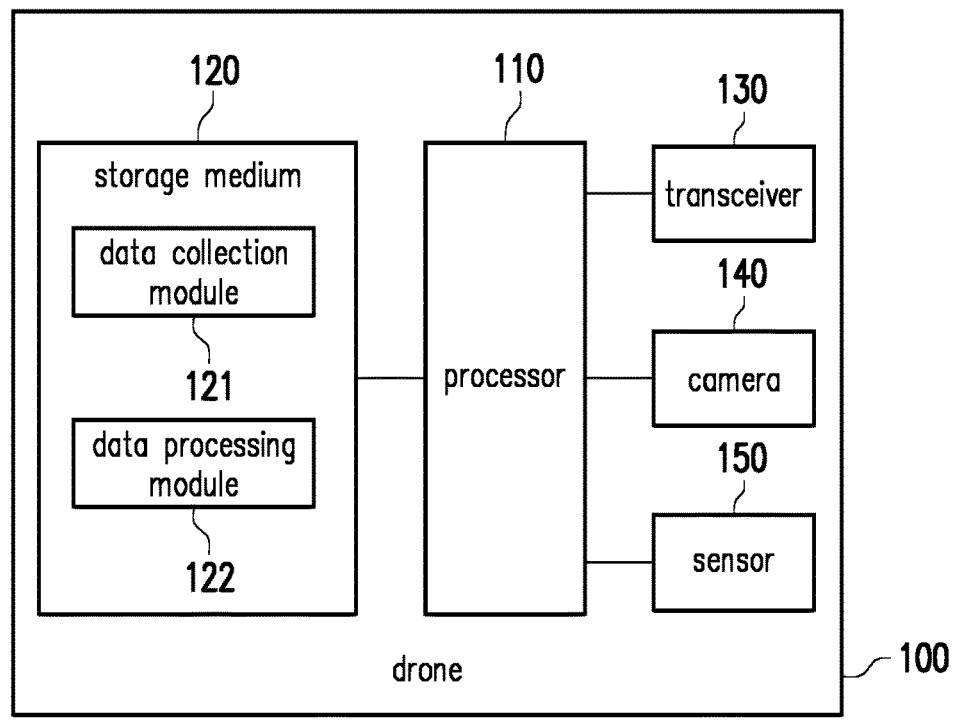
FIG. 2 is a schematic view of a drone according to an embodiment of the disclosure.

FIG. 2 is a schematic view of the drone 100 according to an embodiment of the disclosure. The drone 100 may include a processor 110, a storage medium 120, a transceiver 130, and a camera 140. In an embodiment, the drone 100 may also include a sensor 150.

The processor 110 is, for example, a central processing unit (CPU), or other programmable general-purpose or special-purpose micro control unit (MCU), a microprocessor, a digital signal processor (DSP), a programmable controller, an application specific integrated circuit (ASIC), a graphics processing unit (GPU), an image signal processor (ISP), an image processing unit (IPU), an arithmetic logic unit (ALU), a complex programmable logic device (CPLD), a field programmable gate array (FPGA) or other similar elements or a combination of the above elements. The processor 110 may be coupled to the storage medium 120, the transceiver 130, the camera 140, and the sensor 150, and access and execute multiple modules and various applications stored in the storage medium 120.

The storage medium 120 is, for example, any type of fixed or removable random access memory (RAM), read-only memory (ROM), flash memory, hard disk drive (HDD), solid state drive (SSD) or similar elements or a combination of the above elements, and is configured to store multiple modules or various applications that can be executed by the processor 110. In this embodiment, the storage medium 120 may store multiple modules including a data collection module 121 and a data processing module 122, and the functions thereof will be described below.

The transceiver 130 may transmit and receive signals in a wireless or wired manner. The transceiver 130 may also perform operations such as low noise amplification, impedance matching, frequency mixing, up or down frequency conversion, filtering, amplification, and the like. In an embodiment, the drone 100 can further use the transceiver 130 to measure the communication status (e.g., communication quality) of the local wireless network.

The camera 140 can collect images of the environment around the drone 100 as a reference for flying. The camera 140 is, for example, a complementary metal-oxide-semiconductor (CMOS) camera or a charge coupled device (CCD) camera, and the disclosure is not limited thereto. The drone 100 can determine the relative distance between the drone 100 and the moving platform 200 according to the image captured by the camera 140, or determine the landing point of the drone 100 (i.e., the location of the moving platform 200). In an embodiment, the data collection module 121 can upload the image to the cloud server through the transceiver 130 for the reference of other drones.

The sensor 150 is configured to generate sensing data corresponding to the drone 100. The sensor 150 is, for example, an accelerometer (or angular velocity meter, magnetometer, etc.) configured to sense the flight speed, heading, smoothness, or attitude (e.g., ascending or descending angle) of the drone 100, an electricity meter for sensing the power of the drone 100, or an anemometer for sensing the wind speed around the drone 100, but the disclosure is not limited thereto. In an embodiment, the data collection module 121 can upload the sensing data to the cloud server through the transceiver 130 for the reference of other drones.

Figure 3:
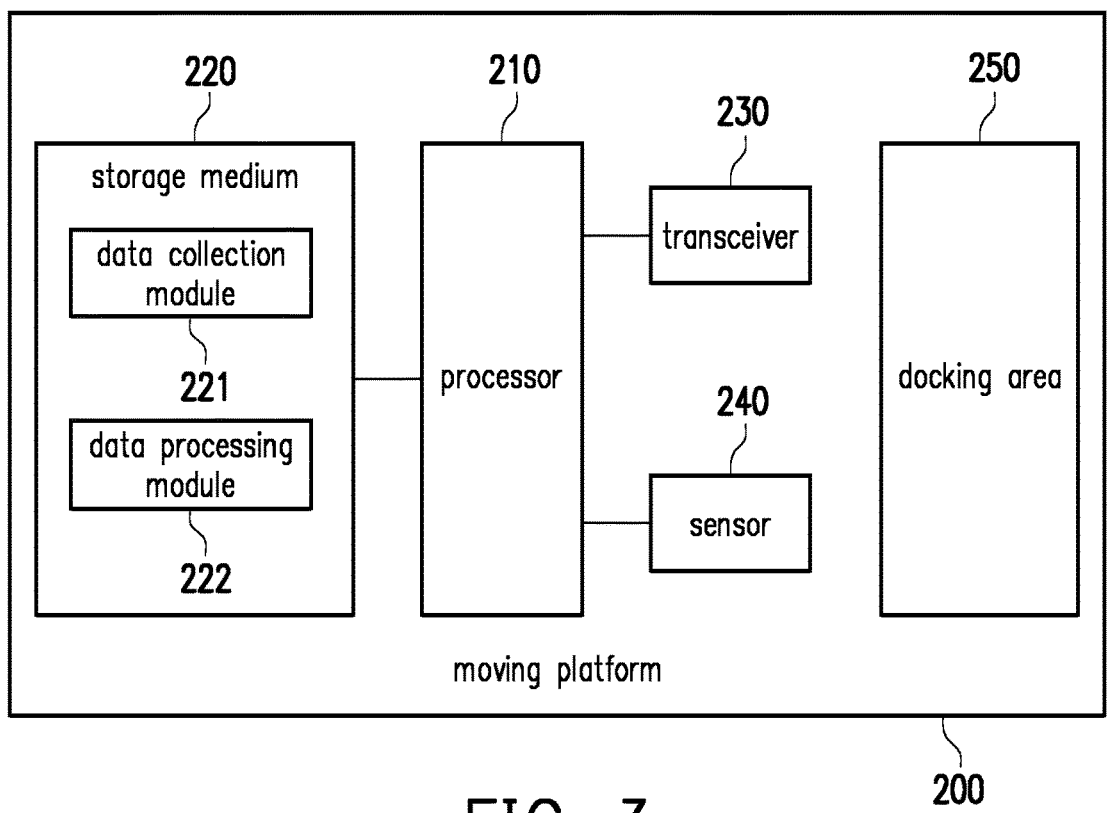
FIG. 3 is a schematic view of a moving platform according to an embodiment of the disclosure.

FIG. 3 is a schematic view of the moving platform 200 according to an embodiment of the disclosure. In this embodiment, the moving platform 200 is, for example, an electronic device with computing capabilities. The moving platform 200 may be fixed on the vehicle 300, and the housing of the moving platform 200 may be used for the drone 100 to dock. The moving platform 200 may include a processor 210, a storage medium 220, a transceiver 230, a sensor 240, and one or more docking areas 250.

The processor 210 is, for example, a central processing unit (CPU), or other programmable general-purpose or special-purpose micro control unit (MCU), a microprocessor, a digital signal processor (DSP), a programmable controller, an application specific integrated circuit (ASIC), a graphics processing unit (GPU), an image signal processor (ISP), an image processing unit (IPU), an arithmetic logic unit (ALU), a complex programmable logic device (CPLD), a field programmable gate array (FPGA) or other similar elements or a combination of the above elements. The processor 210 may be coupled to the storage medium 220, the transceiver 230 and the sensor 240, and access and execute multiple modules and various applications stored in the storage medium 220.

The storage medium 220 is, for example, any type of fixed or removable random access memory (RAM), read-only memory (ROM), flash memory, hard disk drive (HDD), solid state drive (SSD) or similar elements or a combination of the above elements, and is configured to store multiple modules or various applications that can be executed by the processor 210. In this embodiment, the storage medium 220 may store multiple modules including a data collection module 221 and a data processing module 222, and the functions thereof will be described below.

The transceiver 230 may transmit and receive signals in a wireless or wired manner. The transceiver 230 may also perform operations such as low noise amplification, impedance matching, frequency mixing, up or down frequency conversion, filtering, amplification, and the like. In an embodiment, the drone 200 can further use the transceiver 230 to measure the communication status (e.g., communication quality) of the local wireless network.

The sensor 240 is configured to generate sensing data corresponding to the moving platform 200. The sensor 240 is, for example, an accelerometer (or angular velocity meter, magnetometer, etc.) or a global positioning system (GPS) receiver configured to sense the flight speed, heading, or location information of the moving platform 200, a wireless network receiver for sensing the communication status (e.g., communication quality) of the local wireless network (e.g., 5G mobile network), or an anemometer for sensing the wind speed around the moving platform 200, but the disclosure is not limited thereto. In an embodiment, the data collection module 221 can obtain information such as the weather corresponding to the location of the moving platform 200, real-time road conditions or the time at which the moving platform 200 is at the location from the network through the transceiver 230 according to the location information. In an embodiment, the data collection module 221 can upload the sensing data to the cloud server through the transceiver 230 for the reference of other drones.

One or more docking areas 250 may be provided on the housing of the moving platform 200. When the drone 100 needs to be docked on the moving platform 200, the moving platform 200 may instruct the drone 100 (or decided by the drone 100 itself) to dock in one of the one or more docking areas 250.

Figure 4:
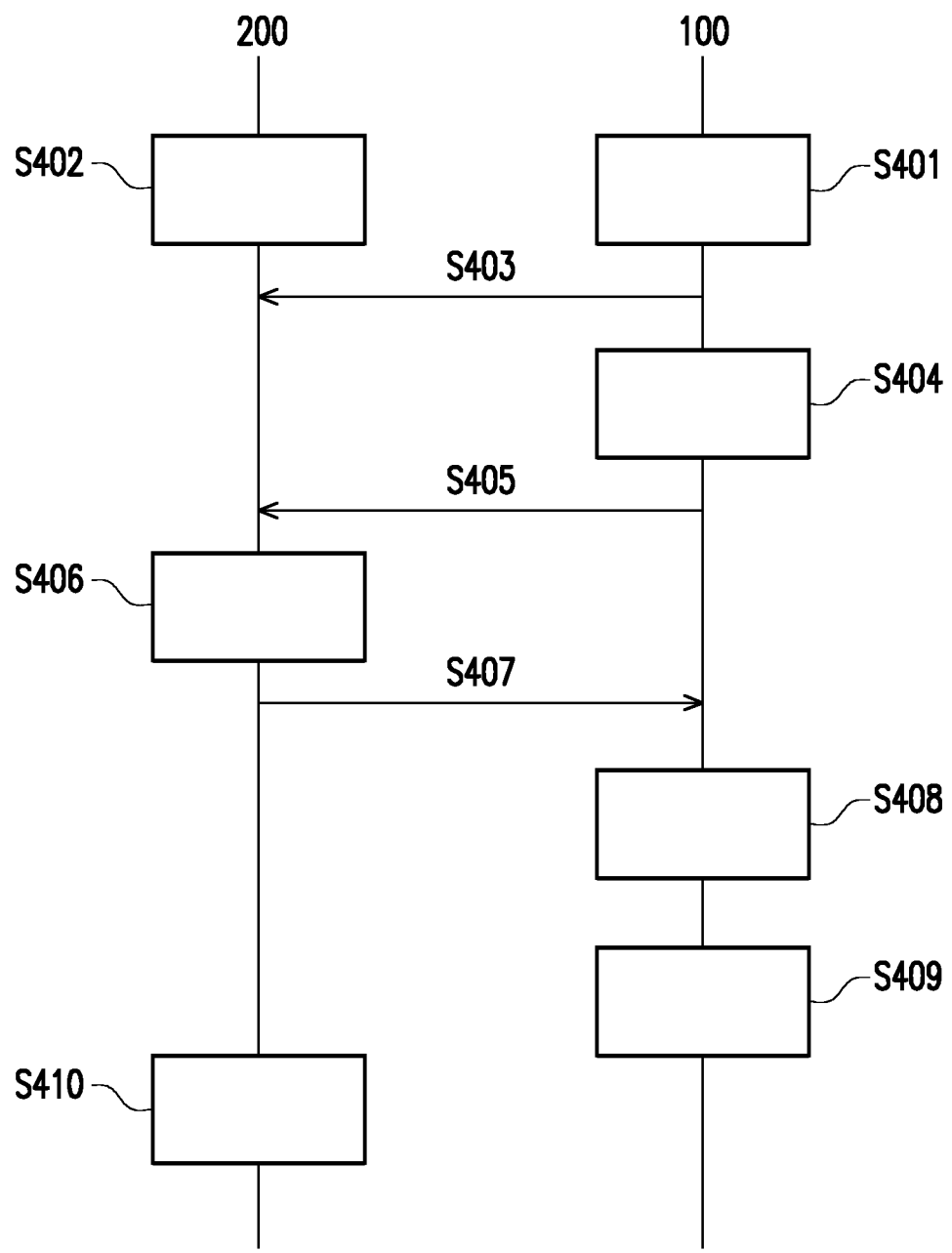
FIG. 4 is a signaling diagram illustrating a process of docking a drone on a moving platform according to an embodiment of the disclosure.

FIG. 4 is a signaling diagram illustrating a process of docking the drone 100 on the moving platform 200 according to an embodiment of the disclosure. In step S401, the data collection module 121 of the drone 100 can obtain the sensing data corresponding to the drone 100 through the camera 140 or the sensor 150, wherein the sensing data includes the following information such as the flight speed, heading, attitude, power, stability and wind speed corresponding to the drone 100. In addition, the sensing data may further include the relative distance between the drone 100 and the moving platform 200.

On the other hand, in step S402, the data collection module 221 of the moving platform 200 can obtain the current environmental data and historical environmental data corresponding to the moving platform 200 through the transceiver 230 or the sensor 240. The current environmental data may be associated with the following information such as the location information, moving speed, moving direction, communication status (e.g., communication quality), wind speed, time, or weather corresponding to the moving platform 200, but the disclosure is not limited thereto. On the other hand, the historical environmental data may include the following information such as road conditions (e.g., slope of road or flatness of road, etc.), but this disclosure is not limited thereto.

In an embodiment, the historical environmental data may further include a record of the previous docking results of the drone 100, wherein the docking results may include the current environmental data generated by the moving platform 200 at that time, the sensing data generated by the drone 100 or a record of whether the docking is successful.

In an embodiment, the data collection module 221 can access the data in the cloud server through the transceiver 230 to obtain the current environmental data or the historical environmental data. For example, the data collection module 221 can read the historical road condition information previously recorded in the cloud server from the cloud server through the transceiver 230. In another example, the data collection module 221 can transmit location information to the cloud server through the transceiver 230, so as to acquire information such as weather or real-time road conditions corresponding to the location information from the cloud server.

In an embodiment, the data collection module 221 may upload the collected current environmental data or historical environmental data to the cloud server through the transceiver 230 for the reference of other drones.

In step S403, the data processing module 122 of the drone 100 can selectively report the collected sensing data to the moving platform 200 through the transceiver 130. Step S403 may be performed periodically by the drone 100. For example, the drone 100 may report the sensing data collected in a specific time period to the moving platform 200 after every specific time period. The sensing data reported by the drone 100 can be used by the moving platform 200 as reference data for instructing the drone 100 to fly.

In step S404, the data processing module 122 of the drone 100 can determine by itself whether to dock on the moving platform 200, or the data processing module 222 of the moving platform 200 can send a message to the drone 100 through the transceiver 230 to instruct the drone 100 to start docking. If the data processing module 122 decides to dock on the moving platform 200, the data processing module 122 may send a request message to the moving platform 200 through the transceiver 130 in step S405, thereby informing the moving platform 200 to start planning the docking process for the drone 100.

In step S406, the data processing module 222 of the moving platform 200 may generate recommended flight parameters for the drone 100 according to the current environmental data and the historical environmental data. For example, the data processing module 222 may perform a variation analysis on the current environmental data or the historical environmental data to determine whether the current situation is suitable for docking the drone 100, and generate recommended flight parameters according to the determining result. Next, in step S407, the data processing module 222 may transmit the recommended flight parameters to the drone 100 through the transceiver 230. In step S408, the data processing module 122 of the drone 100 may adjust the flight parameters of the drone 100 according to the received recommended flight parameters and/or the sensing data generated by the drone 100. The recommended flight parameters or flight parameters may be associated with the attitude, heading, flight speed, etc. of the drone 100. In an embodiment, if the moving platform 200 includes a plurality of docking areas 250, the recommended flight parameters may instruct the drone 100 to dock in one of the plurality of docking areas 250.

In an embodiment, the data collection module 221 may upload the calculated recommended flight parameters to the cloud server through the transceiver 230 for the reference of other drones.

In an embodiment, the data processing module 222 of the moving platform 200 can determine that the moving platform 200 (or the vehicle 300) is about to pass through a curve based on the current environmental data and the historical environmental data. For example, the data processing module 222 may determine that the moving platform 200 is about to pass through a curve based on location information and map data pre-stored in the storage medium 220 or accessed from the cloud server. The data processing module 222 may transmit corresponding recommended flight parameters to the drone 100 in response to that the moving platform 200 is about to pass through a curve, wherein the recommended flight parameters instruct the drone 100 not to dock within a period of time. In this way, it is possible to prevent the drone 100 from docking when the vehicle 300 passes through a curve and causing the docking process unstable.

In an embodiment, the data processing module 222 of the moving platform 200 may transmit the corresponding recommended flight parameters to the drone 100 in response to that the moving speed of the moving platform 200 (or the vehicle 300) is higher than the speed threshold, wherein the recommended flight parameters instruct the drone 100 not to dock within a period of time. In this way, it is possible to prevent the drone 100 from docking when the moving speed of the moving platform 200 is too high.

In an embodiment, the data processing module 222 of the moving platform 200 may transmit the recommended flight parameters to the drone 100 in response to that the communication quality is lower than the communication quality threshold, wherein the recommended flight parameters instruct the drone 100 not to duck within a period of time. In this way, it is possible to prevent the drone 100 from docking when there is a high probability of error in the communication between the drone 100 and the moving platform 200.

In an embodiment, the data processing module 222 of the moving platform 200 may transmit the recommended flight parameters to the drone 100 in response to that the wind speed is larger than the wind speed threshold, wherein the recommended flight parameters instruct the drone 100 not to dock within a period of time. In this way, it is possible to prevent the drone 100 from docking in an unstable manner when it is windy.

In an embodiment, the data processing module 222 of the moving platform 200 may transmit the recommended flight parameters to the drone 100 in response to poor road conditions, wherein the recommended flight parameters instruct the drone 100 not to dock within a period of time. In this way, it is possible to prevent the drone 100 from docking in an unstable manner when the vehicle 300 is traveling on a road with poor road conditions.

After the drone 100 adjusts the flight parameters, in step S409, the data processing module 122 of the drone 100 can control the drone 100 to dock on one or more docking areas 250 of the moving platform 200 according to the flight parameters. Next, in step S410, the data processing module 222 of the moving platform 200 can determine whether the drone 100 is docked successfully. For example, the data processing module 222 can communicate with the drone 100 through the transceiver 230, so as to determine whether the drone 100 is docked successfully according to the content of the communication. After generating a docking result regarding whether the drone 100 is docked successfully, the data processing module 222 of the moving platform 200 can upload the docking result to the cloud server through the transceiver 230 to update the historical environment data in the cloud server.

In an embodiment, the processor 210 of the moving platform 200 may be coupled to an output device (such as a display or a speaker) in the vehicle 300. When the power of the drone 100 is low, the data processing module 122 of the drone 100 can send a warning message to the moving platform 200 through the transceiver 130. The data processing module 222 of the moving platform 200 may prompt the driver in the vehicle 300 to change the route of the vehicle 300 through the output device according to the received warning message. For example, after the transceiver 230 of the moving platform 200 receives the warning message from the drone 100, the data processing module 222 can prompt the driver through the display or speaker in the vehicle 300 to drive the vehicle 300 to the position closer to the drone 100 for the drone 100 to dock. In this way, it is possible to prevent the drone 100 from being unable to reach the moving platform 200 for docking due to low power.

Figure 5:
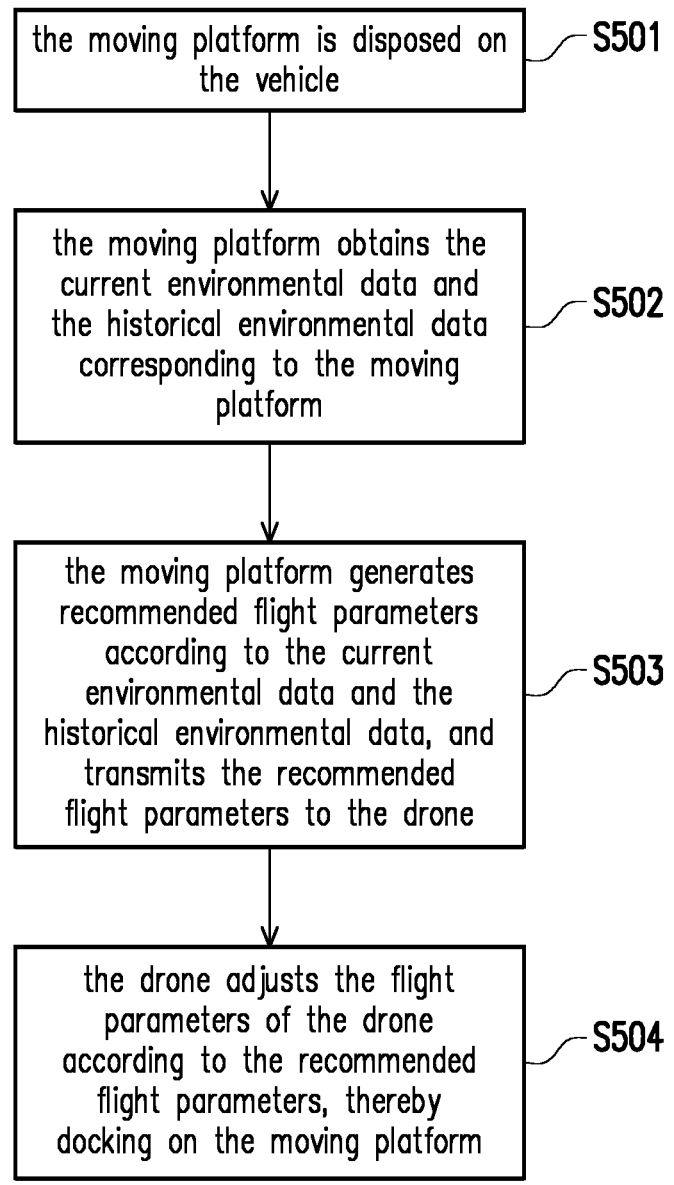
FIG. 5 is a flowchart of a method for drone docking according to an embodiment of the disclosure.

FIG. 5 is a flowchart of a method for drone docking according to an embodiment of the disclosure, wherein the method may be implemented by the system 10 shown in FIG. 1. In step S501, the moving platform 200 is disposed on the vehicle 300. In step S502, the moving platform 200 obtains the current environmental data and the historical environmental data corresponding to the moving platform 200. In step S503, the moving platform 200 generates recommended flight parameters according to the current environmental data and the historical environmental data, and transmits the recommended flight parameters to the drone 100. In step S504, the drone 100 adjusts the flight parameters of the drone 100 according to the recommended flight parameters, thereby docking on the moving platform 200.

In summary, the moving platform in the disclosure can obtain surrounding environmental data through sensors, so as to correct the flight trajectory of the drone through the environmental data. The moving platform can further upload the measured current environmental data and the docking results of the drone to the cloud server as reference data for drone docking in the future. The current environmental data uploaded to the cloud server can be used as a reference for monitoring traffic or communication quality. In other words, when the coverage of the drone of the disclosure increases in various areas, users of the cloud server will be able to acquire real-time road conditions, weather (or walrus), or communication quality information in various areas more easily.

What is claimed is:

1. A system for drone docking, adaptable for a vehicle, wherein the system comprises:
   a drone; and
   a moving platform, disposed on the vehicle and in communication with the drone, wherein the moving platform is coupled to an output device in the vehicle, wherein
   the moving platform obtains current environmental data and historical environmental data corresponding to the moving platform, wherein the current environmental data is associated with at least one of location information, a moving speed, a moving direction, a communication status, a wind speed, time, and weather, and the historical environmental data is associated with a road condition,
   the moving platform generates a recommended flight parameter based on the current environment data and the historical environment data, and transmits the recommended flight parameter to the drone, the drone adjusts a flight parameter of the drone according to the recommended flight parameter, and docks on the moving platform according to the flight parameter, wherein the moving platform determines that the moving platform is about to pass through a curve based on the current environmental data and the historical environmental data, and transmits the recommended flight parameter to the drone in response to that the moving platform is about to pass through the curve, wherein the recommended flight parameter instructs the drone not to dock within a period of time, the drone outputs a route to approach the drone through the output device in response to power of the drone being lower than a power threshold.

2. The system according to claim 1, wherein the recommended flight parameter and the flight parameter are associated with at least one of the following:

an attitude, heading, and a flight speed.

3. The system according to claim 1, wherein the drone adjusts the flight parameter according to sensing data corresponding to the drone and the recommended flight parameter, wherein the sensing data comprises at least one of the following: a flight speed, heading, an attitude, the power, stability, a wind speed and a relative distance between the drone and the moving platform.

4. The system according to claim 1, wherein the moving platform transmits the recommended flight parameter to the drone in response to that the moving speed of the moving platform is larger than a speed threshold.

5. The system according to claim 1, wherein the communication status comprises communication quality, wherein the moving platform transmits the recommended flight parameter to the drone in response to that the communication quality is lower than a communication quality threshold.

6. The system according to claim 1, wherein the moving platform transmits the recommended flight parameter to the drone in response to that the wind speed is higher than a wind speed threshold.

7. The system according to claim 1, wherein the moving platform transmits the recommended flight parameter to the drone in response to a poor road condition.

8. The system according to claim 1, wherein the moving platform comprises a plurality of docking areas, wherein the recommended flight parameter instructs the drone to dock in one of the plurality of docking areas.

9. The system according to claim 1, wherein the moving platform uploads the current environmental data and a docking result of the drone to a cloud server to update the historical environmental data stored in the cloud server.

10. A method for drone docking, adaptable for a drone and a moving platform, wherein the method comprises:

disposing the moving platform on a vehicle, wherein the moving platform is coupled to an output device in the vehicle;

obtaining, by the moving platform, current environmental data and historical environmental data corresponding to the moving platform, wherein the current environmental data is associated with at least one of location information, a moving speed, a moving direction, a communication status, a wind speed, time, and weather, and the historical environmental data is associated with a road condition;

generating, by the moving platform, a recommended flight parameter according to the current environmental data and the historical environmental data, and transmitting the recommended flight parameter to the drone;

adjusting, by the drone, a flight parameter of the drone according to the recommended flight parameter to dock on the moving platform, wherein the moving platform determines that the moving platform is about to pass through a curve based on the current environmental data and the historical environmental data, and transmits the recommended flight parameter to the drone in response to that the moving platform is about to pass through the curve, wherein the recommended flight parameter instructs the drone not to dock within a period of time;

and outputting, by the drone, a route to approach the drone through the output device in response to power of the drone being lower than a power threshold.

* * * * *